(12) United States Patent
Funderburk et al.

(10) Patent No.: US 7,517,585 B1
(45) Date of Patent: Apr. 14, 2009

(54) TEAR INDICATOR FOR TAPE

(76) Inventors: Catherine L. Funderburk, 52-B Chapel St., Charleston, SC (US) 29403; Barbara Wagner, 1287 Old Colony Rd., Mt. Pleasant, SC (US) 29464

( * ) Notice: Subject to any disclaimer, the term of this patent is extended or adjusted under 35 U.S.C. 154(b) by 434 days.

(21) Appl. No.: 10/714,208

(22) Filed: Nov. 16, 2003

(51) Int. Cl.
*B32B 7/12* (2006.01)
(52) U.S. Cl. .................. 428/354; 428/343; 428/906
(58) Field of Classification Search ........... 428/40.1, 428/41.6, 343, 354, 906
See application file for complete search history.

(56) References Cited

U.S. PATENT DOCUMENTS

| | | | |
|---|---|---|---|
| 3,672,935 A * | 6/1972 | Miller et al. ............... 503/220 |
| 4,143,890 A | 3/1979 | Davis et al. | |
| 4,197,346 A | 4/1980 | Stevens | |
| 4,317,743 A | 3/1982 | Chang | |
| 4,324,817 A | 4/1982 | Dahm et al. | |
| 4,425,386 A | 1/1984 | Chang | |
| 4,535,050 A | 8/1985 | Adair et al. | |
| 4,696,856 A | 9/1987 | Okada et al. | |
| 4,898,762 A | 2/1990 | Brown et al. | |
| 4,980,222 A | 12/1990 | Rivera et al. | |
| 5,053,339 A | 10/1991 | Patel | |
| 5,219,194 A | 6/1993 | Trent et al. | |
| 5,279,875 A | 1/1994 | Juszak et al. | |
| 5,525,390 A * | 6/1996 | Yang .................... 428/41.6 |
| 5,882,116 A | 3/1999 | Backus | |
| 6,033,762 A | 3/2000 | Decker | |
| 6,196,383 B1 | 3/2001 | Pinchen | |
| 6,303,539 B1 | 10/2001 | Korarew | |
| 6,395,376 B1 | 5/2002 | Cooley | |
| 6,767,628 B1 * | 7/2004 | Posa et al. ............... 428/343 |
| 2001/0006291 A1 | 7/2001 | Wenninger | |
| 2002/0176975 A1 | 11/2002 | Wright | |
| 2003/0114056 A1 | 6/2003 | Sheely | |

* cited by examiner

*Primary Examiner*—Hai Vo
*Assistant Examiner*—Anish Desai
(74) *Attorney, Agent, or Firm*—B. Craig Killough; Ernest B. Lipscomb, III

(57) ABSTRACT

Tape that visually indicates a tear site of a section of tape from a longer length of tape and that visually distinguishes the tear site from the remainder of the length of tape, so that the end of the roll can be readily identified. The tear site becomes visible upon the reaction of a chromogenic material. The reaction of the chromogenic material is initiated by tearing of the tape, so that a visible mark or indicator results from tearing or cutting the tape.

5 Claims, 5 Drawing Sheets

TEAR INDICATOR FOR TAPE

FIELD OF THE INVENTION

The present invention relates generally to tapes that comprise adhesives, and is more specifically directed to a tape comprising adhesive, wherein the tape visually indicates the tear site upon tearing of the tape.

BACKGROUND OF INVENTION

After tearing or cutting tape from a roll of tape, the user of the tape, such as masking tape, has trouble visually detecting where the tape was last torn. The end of the tape is not visually apparent, since the end of the tape is the same color as the remainder of the roll of tape, and the end of the tape adheres to the remainder of the roll. The user has to feel around the roll to find the end, which may be difficult to find by feel if the end of the tape has adhered to the roll of tape. There is a need for a tape that is contained in a roll to have a visual indicator that differentiates the end of the roll of tape from the remainder of the roll of tape, so that the end can be readily ascertained, and used to extract a segment of tape from the roll.

SUMMARY OF THE INVENTION

It is an object of this invention to provide a tape that visually indicates the tear site and distinguishes the tear site from the remainder of the roll of tape. It is another object of the present invention to provide an adhesive comprising tape wherein a visible mark is made upon tearing of the tape. The tear site becomes visible upon the reaction of chromogenic material. The reaction of the chromogenic material is initiated by tearing of the tape.

DESCRIPTION OF THE PREFERRED EMBODIMENT

In the preferred embodiment, the tape of the invention is a tearable tape comprising an adhesive component. By "tearable," it is meant a tape that is easily torn, such as by fingers, or by a saw-toothed blade of the type typically used for tape dispensers. An example of a tearable tape according to the invention is a general purpose masking tape, which comprises paper and adhesive. Other tapes, such as cloth tapes, vinyl tapes, paper tapes, foam tapes, cloth tapes and film tapes, and most tapes that are commonly contained on a roll may be used according to the invention.

Any suitable adhesive commonly used in the adhesive tape art may be used such as pressure sensitive adhesive or heat sensitive adhesive. Examples of such include, but are not limited to, natural rubber; polybutadienes; styrene-butadiene rubbers, styrene-butadiene-styrene block copolymer and styrene-isoprene-styrene rubber; styrene-isoprene butadiene acrylonitrile polymers; butadiene acrylonitrile rubbers; acrylics; polyacrylic esters; ethylene-vinylacetate copolymers; vinyl ethers; polyester; silicone-based rubber; fluoro-based rubbers; polyvinylbutyral; polychloroprene and polyurethane based adhesives. In a preferred embodiment of the invention, pressure sensitive adhesive is used. The adhesive coating may optionally contain a tackifier, curing agent, softener, stabilizer, plasticizer, antioxidant, and/or UV absorber in addition to the adhesive described.

Figure 1:
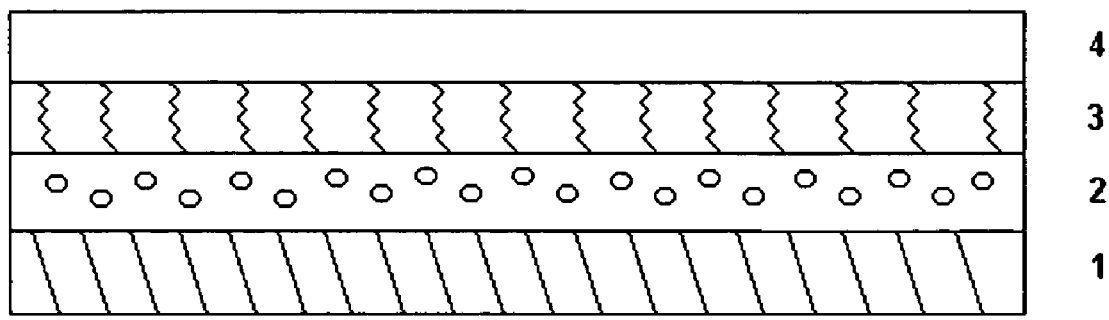
FIG. 1 is a sectioned view of a piece of tape, showing a supporting material 1, a color former layer 2, a color developer layer 3, and an adhesive layer 4.
Figure 2:
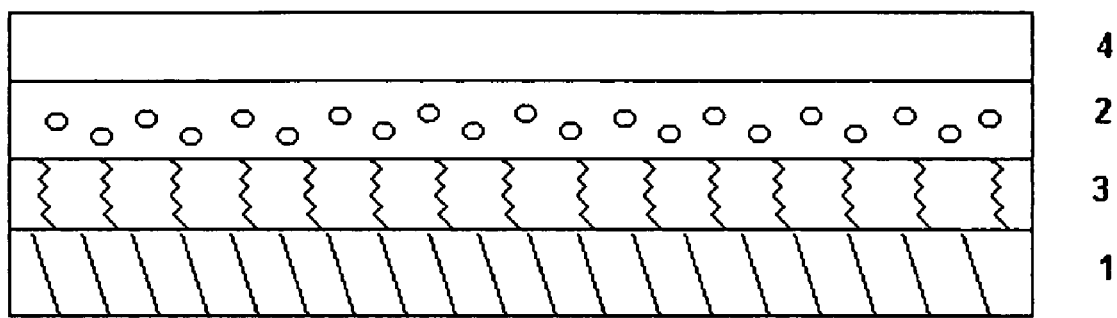
FIG. 2 is a sectioned view of a piece of tape showing a supporting material 1, a color developer layer 3, a color former layer 2, and an adhesive layer, 4.
Figure 3:
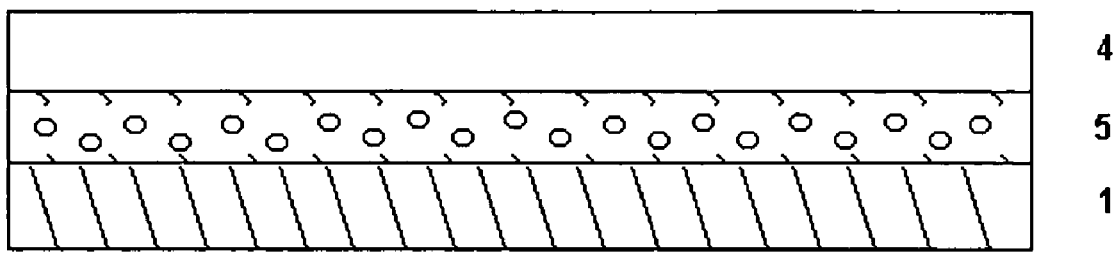
FIG. 3 is a drawing showing a supporting layer 1, a self-contained carbonless layer 5, and an adhesive layer 4.
Figure 4:
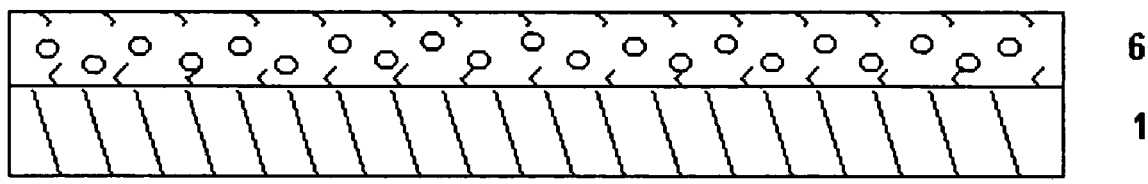
FIG. 4 is a drawing showing a supporting material 1, and a single adhesive and self-contained carbonless coating layer 6.

Carbonless technology is employed in a preferred embodiment of the present invention. Color formers and color developers may be in separate coatings, such as previously described CF, CB and CFB coatings, or both color formers and color developers may be in the same coating, described previously as self-contained carbonless technology. Various configurations are possible and include, but are not limited to, three coating layers comprising an adhesive layer 4, a color former layer 2, and a color developer layer 3, on a supporting material or substrate 1 (FIGS. 1 and 2), and variations thereof; two coating layers comprising an adhesive layer 4, and a self-contained carbonless layer 5 on a supporting material or substrate 1 (FIG. 3); and a single coating, wherein the color formers and color developers are substantially dispersed in the adhesive layer 6 on a supporting material or substrate 1 (FIG. 4). In a preferred embodiment of the present invention, a self-contained carbonless technology is utilized, wherein the color former and color developer are present on the supporting material or substrate in one layer, and are either combined with the adhesive, or are separately applied to the supporting material or substrate.

A self-contained coating may be formed in any manner conventionally employed in the production of self-containing copy paper to provide a composition comprising both pressure-rupturable capsules, or microcapsules, which contain chromogenic material, and color developers. The term "chromogenic" refers to chromogenic materials or chromophores containing materials such as color precursors, color formers, or electron-donating type compounds. Suitable methods for forming a self-contained coating are described in U.S. Pat. Nos. 4,197,346; 4,317,743; 4,324,817 and 4,696,856, the disclosures of which are hereby incorporated by reference.

Suitable chromogens or chromophores include, but are not limited to, lactone phthalides, such as Chrystal Violet Lactone and 3,3-bis-(1'-ethyl-2-methylindol-3"-yl)phthalide; fluorans, such as 6-diethylamino-1,3-dimethylfluoran, 2-anilino-6-diethylamino-3-methylfluoran and 2-dibenzylamino-6-diethylaminofluoran; indolylphthalides, such as 3-(p-dimethylaminophenyl)-3-(1,2-dimethylindole-3-yl) phthalide; azaphthalides, such as 3-(2-ethoxy-4-diethylaminophenyl)-3-(1-octyl-2-methylindole-3-yl)-4-azaphthalide; phthalides, such as 1,3,6,8-tetra (dimethylaminophenyl) phthalide; rhodamine lactams; lactone xanthenes; leucoauramines, such as N-2,4,5-trichlorophenyl leuco auramine; benzoyl leuco methylene blue; 2-(omega substituted vinylene)-3,3-disubstituted-3-H-indoles; 1,3,3-trialkylindolspirans; spiropyrans, such as 3-methylspirodinaphthopyran; and mixtures thereof. The chromogen composition is chosen so that the color formed at the tear site by the chromogen contrasts with the color of the tape. In particular, the color formed by the chromogen at the tear site will usually be selected to contrast with the support material or substrate from which the tape is formed.

Suitable color developers include, but are not limited to, clay minerals, acid activated clays, organic acids, acid polymers, metal salts, zinc salts of alkylsalicylic acids, zinc-modified phenolic resins, aromatic carboxylic acids, alkylphenol-formaldehyde novolac resins and the like, and mixtures thereof.

The coating or coatings may be applied to a supporting material via any known method of application, such as with a die coater, roll knife coater, gravure coated, roll coater, reverse coater or the like. The coating or coatings may be applied via any known formulation method such as hot-melt, solvent-based or aqueous-based coatings.

Coating thickness is typically in the range of 2-40 $g/m^2$, preferably 15-30 $g/m^2$.

Supporting material or substrate for the tape or sheet suitable for use according to the present invention include materials such as paper, creped paper, synthetic paper, coated paper, cast-coated paper, coated film, polyester film, soft vinyl chloride film, polyolefin film, foils, fiberglass, and cloth. The supporting material may be opaque, translucent or transparent. The supporting material may be coated on one side with a release layer which adheres to the supporting sheet, but which is relatively non-adherent to the adhesive containing layer coating the opposite side. The release layer is relatively non-adherent to the adhesive layer, so that when a length of tape is rolled up, each turn of the tape has the release layer in contact with the adhesive layer of the adjacent turn of the tape. Consequently, the turns of the rolled tape will not stick together, and the tape can be easily unrolled.

Figure 5:
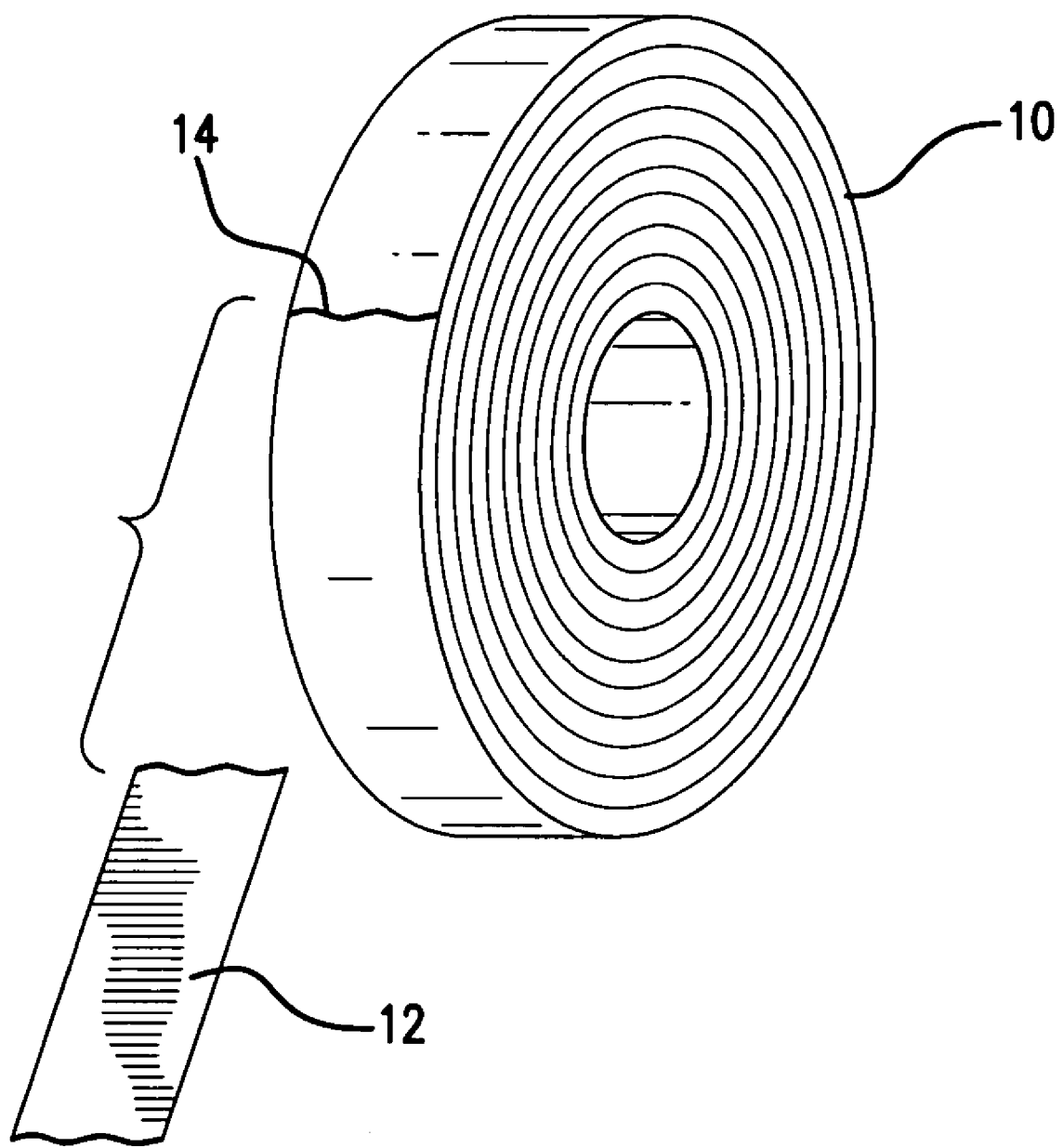
FIG. 5 is a perspective view of a roll of tape that comprises the invention.

The tape is formed on a roll 10 in an appropriate length after the adhesive and chromogen layer(s) are coated on the support material. FIG. 5. In use, lengths of tape 12 are removed from the roll by the user, and are separated from the remainder of the tape that is present on the roll. The separation of the desired length may take place by manually tearing or by cutting the length of tape from the roll, whereupon a tear site 14 is formed. When the length of tape is separated, the capsules or microcapsules containing chromogenic material are ruptured, and the chromogenic material reacts with the color developer component to give a visible color at the tear site. The remainder of the tape does not change color, so that the tear line at the tear site is readily visible against the tape that underlies the tear site.

What is claimed is:

1. A tape that is formed in a roll, comprising:
 a length of support material, said support material having a first layer, a second layer and a third layer coated thereon,
 wherein said first layer comprises an adhesive, said second layer comprises a color former, and said third layer comprises a color developer, and
 wherein each of said first layer, said second layer, and said third layer are separate from each other layer, wherein, when a portion of said length of support material is separated from a remainder of said length of said support material, a tear site is formed on said remainder of said tape where said portion of said length of support material is removed from said remainder of said length of support material, and said color former that is present at said tear site is reacted with said color developer at said tear site, to form a demarcation along said tear site, wherein said demarcation is of contrasting color to said support material.

2. A tape that is formed in a roll as described in claim 1, wherein said color former is encapsulated, and wherein capsules in which said color former is contained are broken at said tear site by removal of said length of support material from said remainder of said length of support material, and said color former is reacted with said color developer at said tear site.

3. A tape that is formed in a roll as described in claim 1, wherein said adhesive layer comprises a pressure-sensitive adhesive.

4. A tape that is formed in a roll as described in claim 1, wherein said color former is a chromogenic material.

5. A tape that is formed in a roll as described in claim 1, wherein said color former changes color to form said demarcation at said tear site by reaction with said color developer.

* * * * *